United States Patent [19]
Hamilton

[11] Patent Number: 5,641,831
[45] Date of Patent: Jun. 24, 1997

[54] ANTI-HAZING SILICONE RUBBER ARTICLE COMPOSITION AND PROCESS FOR MAKING SAME

[75] Inventor: James R. Hamilton, Weatherford, Tex.

[73] Assignee: JMK International, Inc., Fort Worth, Tex.

[21] Appl. No.: 480,539

[22] Filed: Jun. 7, 1995

Related U.S. Application Data

[60] Continuation of Ser. No. 194,791, Feb. 10, 1994, abandoned, which is a division of Ser. No. 936,585, Aug. 26, 1992, abandoned.

[51] Int. Cl.$^6$ ............................ C08G 77/06; C08L 83/04
[52] U.S. Cl. ..................... 524/588; 524/862; 528/15
[58] Field of Search ........................ 524/588, 862; 528/15

[56] References Cited

U.S. PATENT DOCUMENTS

| | | | |
|---|---|---|---|
| 3,696,068 | 10/1972 | Creamer | 525/477 |
| 3,884,866 | 5/1975 | Jeram et al. | 524/703 |
| 3,972,850 | 8/1976 | Hamilton et al. | 260/375 B |
| 4,089,833 | 5/1978 | Simpson | 578/32 |
| 4,339,564 | 7/1982 | Okamura | 528/15 |
| 4,873,274 | 10/1989 | Cummings et al. | 523/500 |
| 4,904,434 | 2/1990 | Hyer | 264/146 |
| 4,981,637 | 1/1991 | Hyer | 264/146 |
| 5,122,562 | 6/1992 | Jeram et al. | 524/588 |
| 5,283,927 | 2/1994 | Gibbon et al. | 15/250.36 |

*Primary Examiner*—Helen Lee
*Attorney, Agent, or Firm*—Jefferson Perkins

[57] ABSTRACT

A silicone rubber article (such as a wiper blade) has a low process fluid leach rate and high resiliency. The composition comprises, prior to cure, approximately 100 parts by weight of a vulcanizable elastomer including at least one silicone polymer, at least one crosslinkable process fluid, and low pressure and high pressure peroxide catalysts to accommodate a two-stage vulcanization process. According to the invention, the composition provides anti-hazing qualities and confers hydrophobic properties to a contacted surface. The polymer also includes about 50 to 220 parts by weight of a siliceous filler.

20 Claims, 1 Drawing Sheet

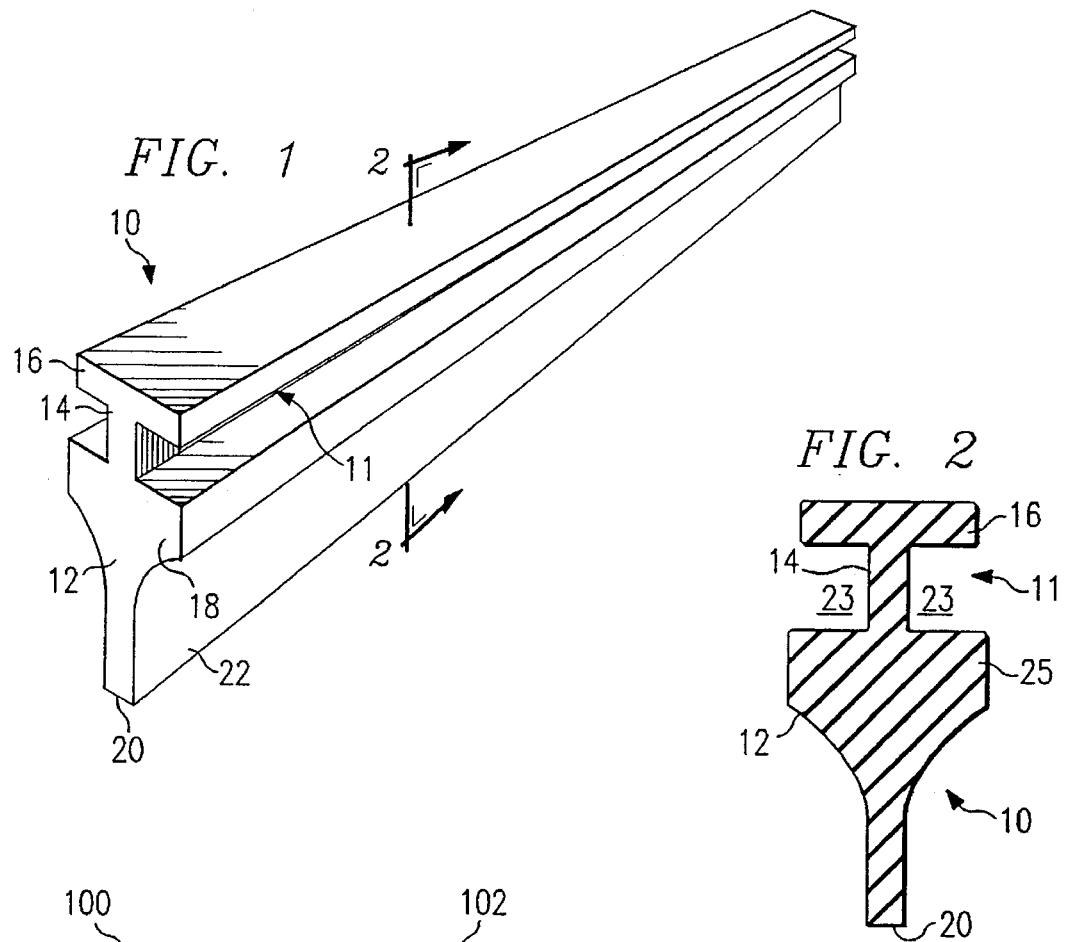

ANTI-HAZING SILICONE RUBBER ARTICLE COMPOSITION AND PROCESS FOR MAKING SAME

This is a continuation of application Ser. No. 08/194,791 filed on Feb. 10, 1994, which is a divisional of application Ser. No. 07/936,585 filed on Aug. 26, 1992, both abandoned, the text of which is hereby incorporated by reference.

TECHNICAL FIELD OF THE INVENTION

This invention relates in general to silicone rubber articles and, more particularly, to an improved silicone rubber article having anti-hazing properties and a composition and process for making same.

BACKGROUND OF THE INVENTION

Silicone rubber, i.e., high molecular weight, vulcanized polydiorganosiloxane, is able to withstand wide temperature variations without an appreciable effect on its physical properties. Silicone rubber is virtually unaffected by ultraviolet radiation, even over long periods of time. It is also resistant to ozone, oil, salt, water and other road and automotive chemicals. Silicone rubber has been used in windshield wiper blades, gaskets, spark plug boots and weather stripping.

However, silicone rubber articles currently existing in the art tend to leave an undesirable coating, or haze, on surfaces in which they come into contact, such as windshields. The coating is caused by the leaching of a low molecular weight silicone polymer process fluid, used to aid in the manufacture of conventional silicone rubber articles. In the case of silicone rubber wipers the process fluid leaches onto the windshield at an unacceptably high rate, yielding a vision-obstructing haze. Experiments indicate that a slower leaching process fluid would not create an undesirable haze, but rather would confer beneficial hydrophobic qualities and anti-hazing properties to the windshield surface.

Additionally, other than for sponge or foam applications, the prior art teaches the use of a single peroxide, either a "high pressure" or a "low pressure" peroxide, as the vulcanization catalyst for the high molecular weight polydiorganosiloxane base. Low pressure peroxide catalysts include diaroyl peroxides such as 2,4-dichlorobenzoyl peroxide. High pressure catalysts include dialkyl and diaralkyl peroxides such as dicumyl peroxide. Formulations using only one peroxide as a catalyst cause a less than optimal amount of crosslinking, with less of a physical barrier to the leaching of low molecular weight silicone process fluid. Wiper blades cured with one catalyst therefore have less than optimal anti-hazing properties.

Use of both a low-pressure and a high-pressure catalyst could theoretically induce an increased degree of crosslinking or cure, and a concomitant increase in elasticity, and resiliency, and decrease in tackiness and compression set. One of the perceived problems in the prior art of using both a "high pressure" and "low pressure" catalyst is that blistering or bubbling by the low-pressure catalyst byproducts will occur at the high temperature needed to "kick off" the high-pressure catalyst, such as 340° F. While such a reaction is desirable for sponge or foam applications, it is not desirable for articles requiring more structural integrity, such as windshield wiper blades, spark plug boots, weather stripping and gaskets.

A long felt need continues to exist for an improved silicone rubber article that confers beneficial hydrophobic qualities and possesses slow-leaching or anti-hazing properties. A need further exists for silicone rubber articles having an increased degree of crosslinking or cure.

SUMMARY OF THE INVENTION

According to the invention, a silicone polymer composition is provided that when formed into a wiper blade or other article and cured, confers beneficial hydrophobic qualities, has slow-leaching or anti-hazing properties and has enhanced resiliency and resistance to compression set.

According to one aspect of the invention, a silicone polymer composition is provided that includes a base having at least one high viscosity, high molecular weight polydiorganosiloxane with an average molecular weight on the order of one million and a viscosity of at least 500,000 centistokes, and a crosslinkable silicone process fluid, which has a molecular weight and a viscosity substantially less than the polydiorganosiloxane. The crosslinkable process fluid preferably has an average molecular weight in the range of 1,000 to 10,000 grams per mole, a viscosity in the range of 5 to 100 centistokes, a hydroxy content of 2 to 20 percent by weight and a mole vinyl content of 0.2 to 13 percent. The silicone polymer composition includes at least one catalyst which is adaptable to crosslink both the process fluid and the high molecular weight silicone polymer.

According to another aspect of the invention, a silicone rubber article is provided which, prior to cure, contains a silicone polymer base with at least one high molecular weight, high viscosity polydiorganosiloxane, a "low pressure" catalyst, and a "high pressure" catalyst. The high pressure catalyst may be a dialkyl or diaralkyl peroxide, and the low pressure may be a diaroyl peroxide. These high pressure and low pressure catalysts cause curing at different temperatures. The low pressure catalyst reacts at a first, lower predetermined temperature such as 240° F. and the high pressure catalyst reacts at a second, higher, predetermined temperature such as 340° F. The curing process according to the invention uses these two catalysts and occurs in two steps. In a first curing step, the low-pressure/catalyst is activated at the first predetermined temperature to effect at least a partial crosslinking or cure of the base. In a successive second curing step, the high-pressure catalyst is activated at the second predetermined temperature to effect further crosslinking and complete the cure. Thus, the low-pressure and high-pressure catalysts react with the base to produce a tightly knit polymer which has improved resiliency and which leaches process fluid slowly. As formed into a wiper blade, the cured silicone rubber imparts desirable hydrophobic qualities to a contact surface.

In a preferred embodiment, the composition includes both a crosslinkable process fluid, a low pressure catalyst and a high pressure catalyst. After cure of the composition, a silicone rubber article is achieved with high resiliency, and with at least a partially crosslinked process fluid contained therein, such that the process fluid leaching rate is reduced both by reduction in free process fluid and by further physical barriers to leaching.

The present invention provides a composition that is useful in the manufacture of windshield wiper blades, spark plug boots, weather stripping and gaskets, and for other articles where exceptional resistance to compression set, resilience and/or decreased process fluid leaching are desirable. The present invention yields a commercially acceptable, anti-hazing silicone wiper blade.

BRIEF DESCRIPTION OF THE DRAWINGS

Further aspects of the invention and their advantages may be discerned from reading the following detailed description when taken in conjunction with the drawings in which:

FIG. 1 is a perspective view of a silicone rubber vehicle wiper blade according to the invention;

FIG. 2 is a transverse cross-sectional view taken substantially along line 2—2 of FIG. 1; and FIGS. 3 and 4 are schematic block diagrams of a continuous extrusion manufacturing processes employing the invention.

DETAILED DESCRIPTION OF THE INVENTION

Silicone rubber articles according to the invention are manufactured using a silicone elastomer gum, which includes a crosslinkable process fluid and at least one and preferably two peroxide catalysts. A filler of siliceous and/or calcareous materials is also included.

Physical Structure

Referring to FIGS. 1–3 of the drawings, like numerals are used for like and corresponding parts of the various drawings. FIG. 1 shows a perspective view of a representative rubber article according to the invention, in the illustrated embodiment a windshield wiper blade, shown generally at 10. The body of wiper blade 10 includes a wiper superstructure retaining element indicated generally at 11 and a squeegee blade 12. The superstructure retaining element 11 includes a thin neck 14 and a relatively thick or wide flange 16.

In a preferred embodiment, the squeegee blade 12 gradually decreases in thickness between a thick base 18 and a relatively thin squeegee blade tip 20. Each side 22 of the squeegee blade 12 is inwardly arcuate from the base 18 to the tip 20.

FIG. 2 shows a cross-sectional view of the wiper blade taken substantially along line 2—2 of FIG. 1. As shown in FIG. 2, blade 10 includes a superstructure-joining or retaining portion 11, a squeegee blade 12 and a preferably flat wiping edge 20.

As shown in FIG. 2, the retainer 16 is defined by a restricted neck 14 formed by longitudinal grooves 23 at opposite sides of the neck 14. The longitudinal grooves 23 extend the length of blade 10 on opposite sides thereof thereby providing the opposite sides of the neck 14 with an outwardly extending flange or retainer 16.

While the present invention is described in conjunction with a wiper blade of a particular shape as illustrated in FIGS. 1 and 2, other silicone rubber articles may be made according to the process of the invention and using the disclosed compositions of the invention. For example, wiper blades of the forms disclosed in application Ser. No. 07/708, 245, assigned to the assignee of this Application and filed on May 31, 1991, and U.S. Pat. Nos. 4,981,637 and 4,904,434 issued to Hyer, commonly assigned to the assignee of the present invention, may also be formed using the process of the invention. The above-referenced application and issued patents are fully incorporated herein by reference. The invention may also be used to form other silicone rubber articles where high resiliency and/or low process fluid leach rates are desirable, such as spark plug boots, engine gaskets, other elastomer components for use in high temperature environments, and weather stripping, to name a few such applications.

Composition

The composition according to the invention includes a silicone polymer base or gum including one or more high molecular weight polydiorganosiloxanes, a preferably crosslinkable silicone process fluid having a molecular weight which is substantially less than the high molecular weight polydiorganosiloxane and at least one catalyst adaptable to crosslink the polysiloxanes of the base and process fluid. Preferably, the catalyst includes a low pressure catalyst and a high pressure catalyst to accommodate a two stage curing process. The gum is preferably cured first at a low temperature and then at a high temperature.

One or more high molecular weight polydiorganosiloxanes may be used to make up the silicone polymer base or gum. The organo side groups of the high molecular weight polydiorganosiloxanes should have a very major portion, such as at least 99%, of saturated side groups, and a very minor portion of unsaturated side groups. For example, the side groups of the silicone polymers can, when taken together, constitute between 99.00 and 99.98 weight percent methyl side groups. Taken as a whole, the high molecular weight polydiorganosiloxanes have a vinyl, phenyl or other nonsaturated side group percentage of 0.02 to 1.0 percent by weight of the total side groups; a preferred range by weight of nonsaturated side groups is 0.1 to 0.3 percent of the total side groups.

While the base may have only one high molecular weight polydiorganosiloxane, the base preferably includes a blend of two high molecular weight silicone polymers: a major portion of dimethylvinylsiloxy-ended polydiorganosiloxane, with the organo side groups consisting of 99.8% weight methyl and 0.2% weight vinyl, and a minor portion of dimethylvinyl-siloxy-ended polydimethylsiloxane. The first component of this polymer blend, that is, the one with vinyl side groups, may range in weight percent between 55 and 76 parts where both constituents total 100 parts, while the second component may range in weight percent between 24 and 45 parts. Each of these two constituents typically have an average molecular weight of about one million, and viscosities in excess of 500,000 centistokes. These high molecular-weight, high-viscosity polydiorganosiloxanes are present in vulcanized form in the cured article in the range of forty to seventy percent by weight.

The process fluid is a relatively low molecular weight, crosslinkable polydiorganosiloxane with a portion of its organo side groups being nonsaturated. The process fluid may be a hydroxy-ended polymethylvinylsiloxane. The molecular weight of the process fluid is in the range of 1,000 to 10,000 grams per mole and has a viscosity in the range of 5 to 100 centistokes. Preferably the process fluid includes a hydroxy content of 2 to 20% by weight and a mole vinyl content of 0.2 to 13%. The process fluid helps to prevent crumbling and premature hardening of the uncured gum through hydrogen bonding. Generally, the higher the percent hydroxy, the lower the quantity of process fluid required to maintain a shelf life or processability window. Additionally, the higher the vinyl percentage, the tighter the crosslink density and lower amount of noncrosslinked process fluid, yielding a greater reduction in the low molecular weight process fluid and other volatile loss (See Table V). In silicone windshield wiper blades, it is the quick leaching (loss) of the low molecular weight process fluid that causes the vision-obstructing haze.

A preferred crosslinkable process fluid is a clear liquid, commercially known as "Mobay Dispersing Agent SI205" (SI205). The physical properties of SI205 include a specific gravity of 0.997; an SiOH content of 19% by weight (±1%); and an Si-vinyl mole content of 3.33% (±0.3%). The process fluid may be present in the gum in amounts ranging from 3 to 10 parts by weight relative to 100 parts by weight of the high molecular weight polymers, and preferably is present at about 7 pph. The amount of process fluid and the amount of reinforcing filler (discussed below) which should be used are related, as the process fluid is used to coat the siliceous or calcareous particles and prevent hardening from hydrogen bonding. Ratios by weight of reinforcing filler to process fluid may vary from three to one to about twelve to one, and preferably are around six to one.

The peroxide catalyst may be chosen from the families of diaroyl, dialkyl and diaralkyl peroxides, and mixtures of these. The diaroyl peroxide catalysts are known as "low pressure" catalysts. Low pressure catalysts include 2,4-dichlorobenzoyl peroxide, which is preferred, dibenzoyl peroxide and mixtures thereof. One such low pressure catalyst is commercially available as TS 50. The dialkyl and diaralkyl peroxides are called "high pressure" catalysts. Usable dialkyl peroxides include dimethyl-2,5-di-(t-butyl peroxy)-hexane, which is preferred, di-t-butyl peroxide, or mixtures thereof. One such high pressure dialkyl peroxide is commercially available as VAROX-P. Dicumyl peroxide is a preferred peroxide of the diaralkyl type; but halogenated and organo substituted derivatives thereof and mixtures of any of the foregoing could also be used. One such high pressure diaralkyl peroxide is commercially available as DICUP 40C. It is also possible to employ a mixture of dialkyl and diaralkyl peroxide catalysts, such as a mixture of VAROX and DICUP.

The ratio of low to high pressure peroxide catalysts can vary from 15/85 to 80/20 by weight depending on the rheology, formulation and processing temperatures preferred. The preferred ratio range is approximately 15/85 to 40/60. A mixture of both high and low pressure combinations could also include the incorporation of platinum catalysts.

In order to optimize crosslink density and reduce volatile loss in a rubber article such as a windshield wiper blade, a combination of high/low pressure peroxides should be used. The high/low pressure cure (discussed infra) in combination with a process fluid having a substantial amount of vinyl side groups is the most efficient method of achieving a slow time release of low molecular weight silicones.

The silicone bases according to the invention preferably include a component of siliceous and/or calcareous or other filler. The filler should be present in the gum in concentrations of between 40 and 220 parts per hundred (pph) parts of the high viscosity polydiorganosiloxanes. Where the cured article is a vehicle wiper blade, it is preferred that the filler concentration should be in the range of 75 and 220 pph. Fillers for this purpose may include from 25 to 200 pph of a large particulate filler having an average diameter of 5 to 100 microns. Such a large particulate filler can, for example, comprise any of several refractory oxides, such as ground quartz, celite (diatomaceous earth), chalk and other siliceous and calcareous minerals, ferrites, alumina, and mixtures thereof. The particulate size of this large particulate component of the filler is preferably in the range of 5 and 30 microns. Ground quartz is a particularly preferred constituent for the large particulate filler component. A second component of the filler has a much smaller size, on the order of 5 microns or smaller. This filler component may comprise from 3 to 140 pph of a refractory oxide or mineral, such as fume or precipitated silica. It is particularly preferred that from 3 to 55 pph of fume silica be present in the small particulate component.

In addition to or in replacement of the fumed silica, precipitated silica can be used. In preferred compositions, from 0 to 36 pph precipitated silica may be used in the filler. As precipitated silica replaces fume silica, relatively more precipitated silica should be used.

The relatively low molecular weight, crosslinkable hydroxy-ended polydimethyl siloxane can be thought of not as a primary silicone constituent of the silicone polymer gum, but instead as a process aid for the coating of the fumed and precipitated silica. The crosslinkable process fluid reacts with the silica surface to keep down hydrogen bonding. It coats the filler surface. Otherwise, the added small particulate filler makes the composition too hard. The high molecular weight silicone polymers and the filler preferably account for at least 90 percent of the weight of the composition of the wiper blade or silicone article. As a weight percentage of the cured article, the filler components are present in the range of 25 to 65 percent.

Other components in a preferred composition include a stabilizing agent that controls additional, unwanted vulcanization due to heat. Such a stabilizer is cerium octoate, present in a concentration between 0.3 and 1.6 pph. The stabilizer does not interfere with the initial vulcanization, but instead stabilizes the composition under warm or hot conditions. A preferred concentration of cerium octoate is about 0.4 pph.

Finally, the composition may include a pigment, which can range from 0.2 to 20 pph. A preferred range of pigmentation is 0.6 to 2.7 pph. These pigments should be peroxide-insensitive pigments and may comprise inorganic oxides or, alternatively, certain organic compounds where extremely bright colors are desired.

Process

According to one aspect of the invention, the silicone polymer is put into a mold having the shape of the article desired and then passed to a curing station.

In another embodiment, the single-stage curing process described above may be replaced with a two-stage curing process. The first stage of the two-stage curing process takes place at a first temperature below the reaction temperature of the high-pressure catalyst, such as 220° to 240° F. After sufficient time for low-pressure cure, such as ten minutes, the article is then passed to a second stage having a temperature above the critical temperature of the high-temperature catalyst, such as at or above 340° F.

According to another aspect of the invention, silicone rubber articles may be made by a continuous extrusion and cure process. Such processes are fully disclosed in U.S. Pat. Nos. 4,981,637 and 4,904,434, both of which are fully incorporated herein by reference.

FIG. 3 is a block diagram of such a continuous extrusion and one-stage curing process as employing the invention. Where the article is an automotive wiper blade or the like, a continuous length of compound formulated according to the invention is extruded from an extruder 100. The extruder may have a hopper (not shown) that feeds into a cold cylinder (not shown). The cooled elastomer is then forced by one or more spiral screws (not shown) out through a dye (not shown). The orifice of the dye forms a cross-sectional shape of, for example, the wiper blade sought to be manufactured (see, e.g., FIG. 2). Extrusion processes of the type described are well known in the art and are discussed, for example, in Lynch, W., *Handbook of Silicone Rubber*, and L. K. Arnold, *Introduction to Plastics*, Iowa State University Press, (1968), pages 46–49. The extrusion dye may be shaped to produce a pair of wiper blades in edge-to-edge relation as is disclosed in either of U.S. Pat. Nos. 4,981,637 or 4,904,434.

The continuous length of extruded elastomer is passed to a curing station 102. This curing station can be a continuous vulcanizer employing a liquid medium such as a eutectic salt bath through which the elastomer is drawn. The salt bath is kept at a temperature of approximately 400° to 500° F., and preferably about 430°. The velocity of the continuous elastomer through the salt bath is controlled such that the total cure time is approximately 1–2 minutes.

The continuous strip of the elastomer is next passed to a separator 106 in the instance that the continuous strip of elastomer is formed in joined pairs such as a pair of wiper blade strips. Various separating techniques are known in the art; two of these are shown in U.S. Pat. Nos. 4,981,637 and 4,904,434. After the two wiper blade halves are longitudinally separated from each other, the two strips of elastomer are passed to a cutter 108, which cuts the wiper blade strips into appropriate sections dimensioned to wipe automotive windshields. This completes the end of a wiper blade squeegee manufacturing process.

FIG. 4 is a block diagram of an alternative extrusion and cure process. This extrusion and cure process is generally similar to the one illustrated in FIG. 3, with the exception that the curing process takes place in two stages. The first stage takes place at a first curing station 102, while the second stage takes place at a second curing stage 104. The first curing station may be a fluid which is kept at a temperature of approximately 220° to 240° F., such that the first or low-pressure catalyst is initiated. The velocity of the continuous elastomer through the first fluid is controlled such that at least a partial cure is obtained using the low-temperature or low-pressure catalyst. After the first curing stage 102, the continuous strip of elastomer is passed to a second curing station 104 which in general may be of a structure similar to the first curing stage 102. The second curing stage 104 may include a eutectic salt bath through which the elastomer is drawn. The temperature of the second curing stage should be in the range of 340° to 500° F. Curing stations 102 and 104 can also be hot air vulcanizing tunnels. The curing stage 102 shown in FIG. 3 can likewise be a hot air vulcanizing tunnel. After the second stage of cure, the continuous stream of elastomer is treated as before.

The present invention solves the problem perceived with two-catalyst curing processes. The prior art suggests that the low temperature catalyst would create large volumes of gaseous byproducts as the article was subjected to temperatures at or above 340° F. The invention has demonstrated, however, that the low pressure catalyst in the invention's curing process causes no bubbles or blistering effects. Any substances formed as a byproduct of the reaction of the low pressure catalyst form non-active species which eventually boil off. The low temperature or low-pressure catalyst is completely decomposed. The high temperature cure imparts further resistance to deformation and compression set. It is thought that the crosslinking created by the high-pressure catalyst may help to prevent the blistering and bubbling of the gum caused by volatization of the low-pressure catalyst by-products.

Further, the combination of the high and low temperature catalysts slows the leaching of the silicone process fluid by at least one of two mechanisms. First, since the crosslinking density produced by both the high and low temperature catalysts is higher than that of the low temperature catalyst alone, there is a greater physical barrier presented to leaching process fluid. Second, since a crosslinkable process fluid is employed, the low and high temperature catalysts act to crosslink the process fluid either to other process fluid molecules or to the high molecular weight polydiorganosiloxane matrix such that less free process fluid is available to leach from the silicone rubber article.

Because of this combination of characteristics, wiper blades and other silicone rubber articles can be manufactured having improved process fluid leach rates. As used for the manufacture of wiper blades, for example, a slower process fluid leach rate means that the free process fluid is deposited upon an automotive windshield at a slower rate and for a longer period of time. It is expected that such wiper blades will impart hydrophobic properties to the automotive windshield glass which they engage, yet will avoid the hazing problems associated with a high process fluid leach rate experienced in certain conventional silicone wiper blades.

EXAMPLES

Two groups of compounds were formulated using various combinations of peroxide catalysts. The first group, consisting of samples labeled A–E, included a base compound (J919) having a crosslinkable process fluid. The second group, samples labeled F–J, included a base compound (J913) having a noncrosslinkable process fluid.

The two base compounds, J919 and J913, used in the following tests are disclosed chemically as follows. The term "pph" means parts per hundred by weight.

|  | J919 (pph) | J913 (pph) |
|---|---|---|
| Dimethyl methylvinyl polysiloxane | 100.0 | 100.0 |
| Organosilane ester | 0.8 | 0.8 |
| Hydroxyterminated dimethyl polysiloxane (noncrosslinkable process fluid) | 0.0 | 7.0 |
| Hydroxyterminated dimethyl methylvinyl polysiloxane (crosslinkable process fluid) | 7.0 | 0.0 |
| Precipitated silica | 40.0 | 40.0 |
| Cerium octoate in dimethyl polysiloxane | 0.4 | 0.4 |
| Diatomaceous earth | 0.0 | 2.0 |
| Ethoxyterminated dimethyl polysiloxane | 0.0 | 3.0 |

As set forth in TABLE I below, samples A–E were formulated using 100 pph by weight of the J919 base compound and listed quantities in pph of various combinations of TS-50, VAROX P and DICUP 40C. The J919 compound includes a crosslinkable process fluid, hydroxyterminated polymethylvinyl siloxane. TS-50 is a commercially available low pressure peroxide catalyst. VAROX P is a commercially available high pressure peroxide catalyst. DICUP 40C is a commercially available version of dicumyl peroxide, which is another high pressure peroxide catalyst.

TABLE I

|  | A | B | C | D | E |
|---|---|---|---|---|---|
| J 919 | 100.0 | 100.0 | 100.0 | 100.0 | 100.0 |
| TS-50 | 0.3 | 0.5 | 0.7 | 0.7 | 0.3 |
| VAROX P | 0.5 | 0.8 | — | 1.0 | 1.5 |
| DICUP 40C | — | — | 0.5 | — | — |

Samples F–J, set forth in TABLE II, were formulated using 100 pph by weight of the J913 base compound and various combinations of the low/high pressure catalysts identified for TABLE I. The J913 compound includes a noncrosslinkable process fluid, hydroxyterminated dimethyl polysiloxane.

TABLE II

|   | F | G | H | I | J |
|---|---|---|---|---|---|
| J 913 | 100.0 | 100.0 | 100.0 | 100.0 | 100.0 |
| TS-50 | 0.3 | 0.5 | 0.7 | 0.7 | 0.3 |
| VAROX P | 0.5 | 0.8 | — | 1.0 | 1.5 |
| DICUP 40 C | — | — | 0.5 | — | — |

Example 1

The first experiment measured the hardness of each of the ten compositions, samples A–J. One hundred grams of each of the ten formulas were individually formed as sample "buttons". Each button was cured in a circulating hot air oven for ten minutes at 240° F., followed by ten minutes at 340° F. Following the two-stage cure, five measurements were taken to determine the hardness of each sample. The average durometer reading for each sample is recorded in Table III, below.

Sample E, which includes a crosslinkable fluid and a higher peroxide content than the other samples, exhibited the greatest hardness. As samples A–E illustrate, an increase in the hardness of the material, indicative of crosslinking, is directly proportional to an increase in the peroxide content. Samples F–J exhibited substantially lower durometer readings, regardless of their respective peroxide content, due to the absence of a crosslinkable process fluid.

TABLE III

| Sample | Durometer of Buttons |
|---|---|
| A | 51 |
| B | 52 |
| C | 50 |
| D | 53 |
| E | 54 |
| F | 44 |
| G | 45 |
| H | 43 |
| I | 46.5 |
| J | 47 |

Example 2

Table IV, below, depicts the results of compression tests performed on the above ten button samples, A–J. The original thickness of each button, $t_o$, was measured and recorded in the left column of Table IV. The buttons were then placed in a circulating hot air oven having a temperature of 350° F. Each button having an original thickness of $t_o + t_s$ was compressed to approximately 50% of its original thickness to a compressed thickness of $t_s$. The compression was relieved after a period of 22 hours. After compression, each button was measured to determine its new thickness $t_i$. The difference between the original thickness, $t_o$, and the new thickness, $t_i$, indicates the overall resiliency of each formulation. Greater resilience is indicated as $t_i$ approaches $t_o$. The resiliency, or memory, of the material is indicative of its crosslinking.

The right-hand column of Table IV indicates the percentage of compression that each button failed to recover, as represented by the following formula:

$$\frac{t_o - t_i}{t_o - t_s} \times 100 = \% \text{ compression set}$$

As illustrated, an increased peroxide catalyst content for those samples including the crosslinkable process fluid, i.e., samples A–E, yielded as increased resiliency of each button. In contrast, samples F–J, which did not include a crosslinkable fluid, exhibited greater inelastic behavior. Accordingly, better crosslinking yields greater resiliency, and higher peroxide concentrations yield improved crosslinking capability.

TABLE IV

| Sample | $t_o$ | $t_s$ | $t_i$ | % Compression Set |
|---|---|---|---|---|
| A | .303 | .141 | .270 | 20.7 |
| B | .303 | .141 | .273 | 18.5 |
| C | .316 | .141 | .285 | 17.5 |
| D | .313 | .141 | .295 | 10.5 |
| E | .3155 | .141 | .296 | 10.8 |
| F | .3095 | .141 | .252 | 34.5 |
| G | .317 | .141 | .259 | 33.0 |
| H | .309 | .141 | .265 | 26.2 |
| I | .313 | .141 | .262 | 29.7 |
| J | .307 | .141 | .265 | 25.3 |

Example 3

The presence of vinyl within the crosslinkable process fluid acts with the peroxide to prevent leaching of the process fluid. Table V, below, illustrates the volatile loss over a two week time period. A small die was used to cut out cylinders having uniform thicknesses and diameters so that exposure to heat was as uniform as possible. These cylinders measured approximately 0.1 inches in diameter with wall thicknesses of approximately 0.075–0.088 inches. The cylinders were then placed in a circulating hot air oven at 350° F. The oven temperature was raised to 400° F. during the final two weeks of the experiment. The specimens were weighed at various intervals over a 20 day period to determine any mass loss. All weights are measured in grams with a margin of error of ±0.01 g. The bottom row depicts total mass loss for each sample.

Among samples A–E, total weight loss ranged from 0.0206 to 0.0304 grams. Weight loss among samples F–J ranged from 0.0727 to 0.0836 grams. Notably, the mass loss among the samples without the crosslinkable fluid, samples F–J, was almost three times that of samples A–E, which included crosslinkable fluid. Table V indicates that the presence of the vinyl within the crosslinkable process fluid found in samples A–E crosslinks in the presence of the peroxide catalyst such that leaching of the process fluid is reduced. Due to such crosslinking, process fluid mass loss is reduced.

TABLE V

| DATE | A | B | C | D | E | F | G | H | I | J |
| --- | --- | --- | --- | --- | --- | --- | --- | --- | --- | --- |
| TARE | 1.5030 | 1.4782 | 1.5115 | 1.4555 | 1.4800 | 1.5033 | 1.3306 | 1.3245 | 1.3243 | 1.4882 |
| day 1 | 2.8227 | 2.8235 | 3.1832 | 2.8630 | 3.0142 | 2.8950 | 2.8179 | 1.8477 | 2.8020 | 3.1002 |
| day 3 | 2.8180 | 2.8166 | 3.1795 | 3.8597 | 3.0101 | 2.8844 | 2.8021 | 2.8307 | 2.8902 | 3.0920 |
| day 7 | 2.8153 | 2.8143 | 3.1743 | 2.8574 | 3.0085 | 2.8775 | 2.7932 | 2.8225 | 2.8856 | 3.0852 |
| day 8 | 2.8145 | 2.8129 | 3.1731 | 2.8557 | 3.0069 | 2.8722 | 2.7892 | 2.8171 | 2.8801 | 3.0811 |
| day 12 | 2.8102 | 2.8059 | 3.1684 | 2.8489 | 3.0018 | 2.8593 | 2.7693 | 2.7913 | 2.8615 | 3.0628 |
| day 14 | 2.8074 | 2.8026 | 3.1650 | 2.8443 | 2.9991 | 2.8511 | 2.7621 | 2.7829 | 2.8532 | 3.0552 |
| day 20 | 2.8021 | 2.7931 | 3.1581 | 2.8349 | 2.9898 | 2.8166 | 2.7395 | 2.7541 | 2.8219 | 3.0275 |
| Net Loss | .0206 | .0304 | .0251 | .0281 | .0244 | .0781 | .0784 | .0836 | .0801 | .0727 |

In summary, novel silicone polymer rubber compositions and articles have been disclosed that when cured have increased resiliency, slower process fluid leach rates and, as wiper blades, have anti-hazing properties. Novel methods of manufacture are disclosed to create such articles.

While the present invention has been described with the aid of the above detailed description and the examples, the invention is not limited thereto but only by the scope and spirit of the appended claims.

What is claimed is:

1. A silicone rubber vehicle wiper blade, formed according to the following process:

providing a compound having a major portion of a silicone polymer including at least one polydiorganosiloxane having a viscosity of more than 500,000 centistokes, a minor portion of a hydroxy-ended crosslinkable silicone process fluid having a viscosity of less than 100 centistokes, a low pressure catalyst adaptable to promote silicone crosslinking at a first predetermined temperature, a high pressure catalyst adaptable to promote silicone crosslinking at a second predetermined temperature at least 110° F. higher than said first predetermined temperature, and a portion of filler including a small particulate filler having a size of less than or equal to 5 microns;

elevating the compound to said first temperature;

responsive to elevating the compound to said first temperature, crosslinking said silicone polymer and said process fluid using only said low-pressure catalyst;

allowing the low pressure catalyst to decompose to inactive species including gas-phase compounds;

allowing the gas-phase compounds to escape the compound at a sufficiently slow rate that no blistering or bubbling occurs;

thereafter elevating the compound to said second temperature; and responsive to elevating the compound to said second temperature, further crosslinking said silicone polymer and said process fluid using said high pressure catalyst.

2. The silicone rubber vehicle wiper blade of claim 1, wherein said high molecular weight polydiorganosiloxane is present in the range of forty to seventy percent by weight.

3. The silicone rubber vehicle wiper blade of claim 1, and further including a major portion of siliceous or calcareous filler.

4. The silicone rubber vehicle wiper blade of claim 3, wherein said filler is present in the range of twenty-five to sixty-five percent by weight.

5. The silicone rubber vehicle wiper blade of claim 1, wherein said hydroxy-ended low molecular weight silicone process fluid is present in the range of about three to ten parts by weight per hundred parts of said silicone polymer prior to said steps of crosslinking.

6. The silicone rubber vehicle wiper blade of claim 1, wherein said hydroxy-ended low molecular weight silicone process fluid comprises from two to twenty percent hydroxy content by weight of the process fluid, and from 0.2 to 13 percent mole vinyl content.

7. The silicone rubber vehicle wiper blade of claim 1, wherein the low pressure catalyst is a diaroyl peroxide.

8. The silicone rubber vehicle wiper blade of claim 1, wherein the high pressure catalyst is selected from the group consisting of dialkyl and diaralkyl peroxides and mixtures thereof.

9. The silicone rubber vehicle wiper blade of claim 1, wherein said polydiorganosiloxane has an average molecular weight on the order of 1,000,000, a viscosity prior to said steps of crosslinking of at least 500,000 centistokes, wherein the organo side groups of the polydiorganosiloxane are from 0.02 to 1 mole percent vinyl and the rest methyl, and wherein the polydiorganosiloxane is present in the gum in the range of 40 to 70 percent by weight.

10. The silicone rubber vehicle wiper blade of claim 1, wherein said hydroxy-ended silicone process fluid is a crosslinkable polydiorganosiloxane having a hydroxy content of 2 to 20 percent by weight of the process fluid, a vinyl content 0.2 to 13 mole percent with respect to the total number of organo side groups on the last said polydiorganosiloxane, an average molecular weight in the range of 1,000 to 10,000 and a viscosity prior to said steps of crosslinking in the range of 5 to 100 centistokes.

11. The silicone rubber vehicle wiper blade of claim 7, wherein said low pressure catalyst is selected from the group consisting of 2,4-dichlorobenzoyl peroxide and dibenzoyl peroxide.

12. The silicone rubber vehicle wiper blade of claim 8, wherein said high pressure catalyst is selected from the group consisting of dimethyl-2,5-di-(t-butyl peroxy)hexane, di-t-butyl peroxide, dicumyl peroxide, halogenated and organo substituted derivatives of dicumyl peroxide, and mixtures thereof.

13. The silicone rubber vehicle wiper blade of claim 8, wherein the high pressure catalyst is present in the compound prior to said step of elevating the compound to said second temperature in the range of 0.5 to 1.5 parts by weight relative to 100 parts by weight of said silicone polymer.

14. The silicone rubber vehicle wiper blade of claim 1, wherein the low-pressure catalyst is selected from the group consisting of 2,4-dichlorobenzoylperoxide and dibenzoyl peroxide, the first temperature being approximately 240° F.

15. The silicone rubber vehicle wiper blade of claim 1, wherein the high-pressure catalyst is selected from the group consisting of dimethyl-2, 5-di-(t-butyl peroxy) hexane, di-t-butyl peroxide, dicumyl peroxide, halogenated and organo substituted derivatives of dicumyl peroxide, and mixtures thereof, the second temperature being about 340° F.

16. The silicone rubber vehicle wiper blade of claim 1, wherein said small particulate filler consists of 3 to 140 parts by weight of fume or precipitated silica, relative to one hundred parts by weight of said silicone polymer.

17. The silicone rubber vehicle wiper blade of claim 16, wherein said small particulate filler includes from 3 to 55 parts of fume silica.

18. The silicone rubber vehicle wiper blade of claim 16, wherein said small particulate filler includes no more than 36 parts of precipitated silica.

19. The silicone rubber vehicle wiper blade of claim 1, wherein said first temperature falls in the range of 220°–240° F.

20. The silicone rubber vehicle wiper blade of claim 1, wherein said second temperature falls in the range of 340°–500° F.

* * * * *